United States Patent Office

2,962,534
Patented Nov. 29, 1960

2,962,534

PREPARATION OF UNSATURATED ETHERS

Amelio E. Montagna and Donald H. Hirsh, both of South Charleston, W. Va., assignors to Union Carbide Corporation, a corporation of New York No Drawing. Filed Apr. 10, 1957, Ser. No. 651,833

2 Claims. (Cl. 260—614)

This invention relates to the production of unsaturated organic ethers. In one aspect this invention relates to a method of preparing ethers of 1,4-alkadien-1-ols by the dealcoholation of acetals of 4-alkenals. In another aspect this invention relates to the unsaturated ethers resulting from said method.

Unsaturated organic ethers have been prepared by various methods. Collardeau and Fluchaire, U.S. Patent 2,546,431, prepared vinyl allyl ether by the vinylation of allyl alcohol with acetylene. Hurd and Pollack (Jour. Amer. Chem. Soc., 60, 1938) attempted to prepare vinyl allyl ether by cracking diallyl acetal acetaldehyde using p-toluenesulfonic acid catalyst. However, this method produced but small quantities of ether. Hurd also cracked diallyl acetal in the presence of phosphorus pentoxide in quinoline or dimethyl aniline as a solvent thereby obtaining vinyl allyl ether in 12 to 19 percent yields. This method is in accord with the process suggested by Claisen (Berichte, 31, 1021). Hurd and Pollack also prepared vinyl allyl ether in 51 percent yield by reacting β-bromoethyl allyl ether with powdered potassium hydroxide.

United States Patent No. 2,667,517, issued to R. L. Longley, proposed the production of alkyl alkylene ethers by the dealcoholation of a dialkyl acetal of a saturated aliphatic aldehyde by contacting said acetal with a hot solution of an aromatic sulfonic acid in an inert high boiling solvent.

According to the present invention, we have discovered a novel process of dealcoholating a class of acetals heretofore not contemplated as starting materials by prior art methods to produce novel unsaturated organic ethers. The acetals contemplated as the starting material in the instant invention are the dialkyl or dialkenyl acetals of 4-pentenals which, in the liquid phase and in the presence of a catalyst described hereinbelow, are decomposed to alkyl or alkenyl 1,4-pentadienyl ethers. By our process the above-mentioned novel ethers can be obtained in 85 to 90 percent yield, and higher, and at 95 percent efficiency.

Accordingly, one or more of the following objects will be achieved by the practice of our invention.

It is an object of this invention to provide a novel process for producing unsaturated organic ethers. It is also an object of this invention to produce novel alkyl or alkenyl 1,4-pentadienyl ethers. It is a further object of this invention to conduct a novel liquid phase reaction wherein a dialkyl or dialkenyl acetal of a 4-pentenal is decomposed to an unsaturated organic ether. A still further object of this invention is to prepare novel alkyl or alkenyl ethers of 1,4-pentadien-1-ols by the liquid phase decomposition of a dialkyl or a dialkenyl acetal of a 4-pentenal.

Numerous other objects of the present invention will become apparent to those skilled in the art from a consideration of the instant specification.

The acetals contemplated as the starting material of this process have the following structural formula:

I 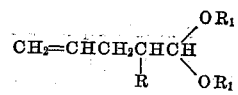

wherein $R_1$ is selected from the group consisting of alkyl and alkenyl radicals, preferably containing not more than 12 carbon atoms, such as methyl, ethyl, propyl, isopropyl, butyl, isobutyl, 2-ethylbutyl, hexyl, 2-ethylhexyl, octyl, decyl, dodecyl, allyl, crotyl, 3-butenyl, 2-methyl-2-pentenyl, 2-ethyl-2-hexenyl, 4-pentenyl, 2-octenyl and the like; and R is selected from the group consisting of hydrogen and an alkyl radical, preferably an alkyl radical having from 1 to 8 carbon atoms, such as methyl, ethyl, propyl, butyl, isobutyl, amyl, hexyl, 2-ethylbutyl, 2-ethylhexyl, octyl, and the like.

Illustrative acetals which can be employed in the present invention include, among others, the dialkyl or dialkenyl acetals of 4-pentenals such as the dimethyl, diethyl, dipropyl, diisopropyl, dibutyl, diisobutyl, dihexyl, di-2-methylpentyl, di-2-ethylhexyl, didecyl, diallyl, dicrotyl, di-2-hexenyl, di-2-ethyl-2-hexenyl, di-4-pentenyl, etc., acetals of 4-pentenals, such as 4-pentenal, 2-methyl-4-pentenal, 2-ethyl-4-pentenal, 2-butyl-4-pentenal, 2-hexyl-4-pentenal and the like.

As is well known acetals may be prepared by way of the reaction of an aldehyde with two mols of an alcohol as illustrated by:

II 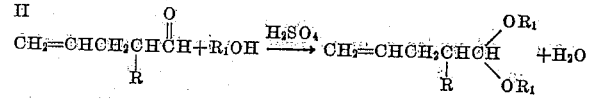

wherein R is a hydrogen atom or an alkyl radical, and wherein $R_1$ is an alkyl radical or an alkenyl radical other than a 1,2-alkenyl radical (α,β-unsaturated aliphatic alcohols such as vinyl alcohol, 1,2-propenyl alcohol, etc., have not been isolated).

The 4-pentenal starting materials (Equation II) can be prepared in several ways. A particularly attractive method is the rearrangement of a 1-alkenyl 2-alkenyl ether by the influence of heat:

III 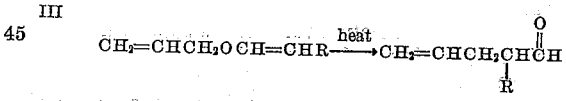

wherein R is a hydrogen atom or an alkyl radical.

Referring to Equation II, the position of the double bond in the alkenyloxy radicals of the acetal product is not critical, except those unsaturated in the 1,2-position would not be available via the direct synthesis of Equation II. An indirect synthesis would be necessary, as for example:

IV 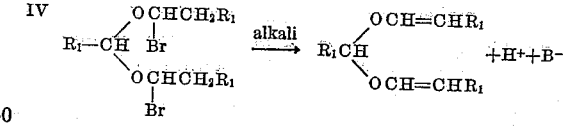

wherein $R_1$ is a hydrogen atom or an alkyl radical.

The dealcoholation reaction of the present invention may be illustrated by the chemical equation:

V 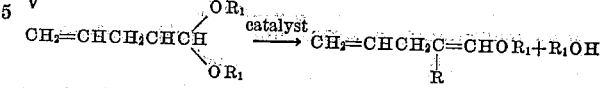

which illustrates the production of ethers of 1,4-pentadien-1-ols and the alcohol coproduct, except when $R_1$ is a 1,2-alkenyl radical; then $R_1OH$ apparently isomerizes to the aldehyde.

As is evident from above Equation V the novel unsaturated aliphatic ethers of the present invention have the following structural formula:

VI 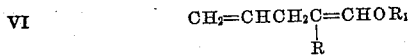

wherein the variables R and R₁ have the same meanings noted in Formula I above.

Illustrative unsaturated aliphatic ethers produced by the method of the present invention include, among others, 1,4-pentadienyl methyl ether, 1,4-pentadienyl ethyl ether, 1,4-pentadienyl propyl ether, 1,4-pentadienyl butyl ether, 2-methyl-1,4-pentadienyl propyl ether, 1,4-pentadienyl allyl ether, 1,4-pentadienyl crotyl ether, 2-butyl-1,4-pentadienyl allyl ether, 1,4-pentadienyl 4-pentenyl ether, 2-butyl-1,4-pentadienyl 2-ethyl-2-hexenyl ether, and the like.

The optimum operating conditions of the process of the instant invention depend on several considerations such as the ether being produced, rate of decomposition of the acetal, vapor pressures of the acetal and final products, the particular catalyst employed, and other factors.

In general, the operable temperature range is from about 75° C. to about 225° C., preferably from about 100° C. to about 200° C. It is preferred to employ a reaction temperature close to the boiling point or slightly below the boiling point of the acetal at the reaction pressure in order to rapidly remove the ether formed in the dealcoholation process e.g., by distillation. A pressure in the range from about 0.1 mm. to about 760 mm. of Hg is suitable in our process; a pressure range from about 1.0 mm. to about 760 mm. of Hg is particularly desirable. As a practical matter the reaction is preferably conducted under reduced pressure in the case of high-boiling acetals and at or near atmospheric pressure in the case of low-boiling acetals, in order to achieve reaction temperatures in the optimum range.

The catalysts contemplated in our method are the strong mineral acids which are substantially non-volatile at the reaction temperature and pressure, acid reacting salts, and activated earths and clays. Exemplary catalysts include phosphoric acid, sulfuric acid, zinc chloride, aluminum chloride, sodium hydrogen sulfate, Super-Filtrol X–202 [1], and the like.

The mineral acids are preferred with phosphoric acid being particularly satisfactory.

The term "dealcoholation catalyst" as applied throughout this specification and appended claims encompasses those dealcoholation catalysts exemplified above, i.e., strong mineral acids, acid-reacting salts, and activated clays.

The catalyst is employed in catalytic quantities, and, in general, a catalyst concentration in the range from about 0.005 to about 5.0 percent by weight of the acetal being decomposed is suitable. A catalyst concentration range from about 0.01 to about 1.0 percent by weight is preferred, in the case of the strong mineral acids. Somewhat higher concentrations are preferred in the case of the other catalysts. As a practical matter the concentration of the catalyst will be determined by the rate of dealcoholation desired.

In our method for preparing ethers of 1,4-pentadien-1-ols one desirable procedure is to heat the corresponding acetal to a temperature sufficient to vaporize the ether and alcohol produced, preferably to a temperature near the boiling point of the acetal under the reaction pressure. After the acetal being heated has attained the desired temperature, a strong mineral acid, preferably a solution of said acid in the acetal being decomposed, is introduced into the previously heated acetal. Under the influence of the acid catalyst the acetal heated is dealcoholated and the desired unsaturated aliphatic ether is produced in the heated reaction mixture, and, once produced, is vaporized. The vapors are recovered overhead substantially at the rate at which they are produced in the reaction vessel.

When a solid catalyst such as aluminum chloride or activated clay is employed the catalyst can be added to the acetal and the mixture subsequently heated to the reaction temperature. Our method is preferably operated as a continuous process although a batch process is satisfactory. Under continuous operation fresh acetal is added to replenish that decomposed, and additional catalyst can be added, if needed, to maintain the desired rates of production of the ether.

The condensed vapors of the unsaturated aliphatic ether and the alcohol co-product are preferably collected under neutral or alkaline conditions, that is, at a pH of 7 or higher, to prevent polymerization of the ether or recombination of the ether with the alcohol. It is desirable to collect the condensate under alkaline conditions and alkaline materials suitable for this purpose include, for example, the nitrogen-containing bases, such as ammonia, alkyl amines, e.g., di(2-ethylhexyl)amine, pyridines and the like; inorganic bases such as sodium hydroxide and carbonate; alcoholates such as sodium alcoholates, etc. The preferred inhibitor is an alkaline compound which is soluble in the condensate. By the above expedient increased yields of the ether are obtained. It has also been observed that the yield of the unsaturated aliphatic ether can be increased by removing said ether from the reaction vessel substantially at the rate at which it is produced.

A suitable apparatus is a reaction vessel attached to a fractionating distillation column, condenser and receiver. The column is preferably of such capacity so as to rectify and remove the vaporous co-products, i.e., unsaturated ether and the alcohol, at approximately the rates at which they are produced. It is less desirable to remove the vapors from the reaction vessel without rectification inasmuch as this results in some of the acetal being removed with the ether and alcohol produced, and hence, in lowered yields per pass of acetal. Operation without rectification results in the same chemical efficiency but entails recovering and recycling larger amounts of the acetal, whereas with suitable rectification it is possible to obtain essentially quantitative conversion of the acetal in a single pass. On the other hand, it is undesirable to operate in such a manner that the ether is returned to the reactor for this may result in lowered yields due to polymerization of the ether upon prolonged contact with the catalyst. Optimum operating conditions appear to be attained when partial rectification of the products is employed.

The preferred method for the liquid-phase dealcoholation of, for example, acetals of 4-pentenal to produce ethers of 1,4-pentadien-1-ol, consists of charging the acetal to a kettle of a still which has a rectifying column. The acetal is heated to the boiling temperature at the operating pressure which is regulated to result in a boiling temperature range from about 75° C. to about 225° C. When the vapors of the acetal have risen into the lower part of the column, an acid catalyst, e.g., phosphoric acid, preferably as a dilute solution in the acetal, is added slowly to the boiling acetal in the kettle until the desired rate of dealcoholation is attained. At this time, the feeding of catalyst is discontinued, and the introduction of acetal without catalyst is started. This feed of acetal is continued to maintain a constant volume of liquid in the kettle while the products of the dealcoholation (alcohol and ether) are removed overhead from the kettle virtually as rapidly as they are formed. In the still column, the vaporous products of the dealcoholation reaction are substantially separated from the vaporous acetal by rectification of these vapors, and the acetal is returned to the kettle for ultimate dealcoholation. Throughout the operation the kettle temperature is pref- ---
[1] Montmorillonite clay treated with mineral acid.

erably maintained at approximately the boiling point of the acetal at the operating pressure.

As stated above the rate of removal of distillate is preferably adjusted so that little or no acetal is removed with the distillate and so that little or no ether is returned to the kettle. The operation is preferably controlled by maintaining, at a point in the still column about one-third the length of the column from the top, a temperature which is, for example, about 5 to 10 degrees higher than the boiling point of the higher boiling of the two products of the dealcoholation, i.e., alcohol and ether. This procedure assures substantially complete removal of the products of dealcoholation with little or no acetal being taken overhead with the distillate.

The alkyl or alkenyl 1,4-pentadienyl ethers of this invention can be polymerized through the 1-position of the 1,4-pentadienyl radical, using acidic type catalysts such as boron trifluoride, ferric chloride, stannic chloride, or aluminum trichloride. The linear polymers so obtained would be useful in the formulation of tackifers or pressure-sensitive adhesives. Further, they are also capable of undergoing further reaction at the 4-position of the 1,4-pentadienyl radical or at the unsaturated link of the alkenyl radical. Such reaction could include: halogenation to give increased chemical inertness, increased stiffness, or increased fire resistance to the linear polymer; or further polymerization with various peroxide catalysts such as hydrogen peroxide, diacetyl or dilauroyl peroxides, or polymerization using ultraviolet light or high velocity nuclear particles. These polymerized products, produced by cross-linking, would be rubber-like and of value in the manufacture of synthetic coatings or elastic films. Still further, these 1,4-dienyl ethers should be readily isomerizable to the isomeric conjugated dienyl ethers whose uses, as a class, are known.

The following examples are illustrative.

*Example I*

Four-hundred grams of 1,1-diallyloxy-4-pentene (the acetal of 4-pentenal and allyl alcohol) was charged into a 1-liter still kettle and heated to boiling at 150 mm. of mercury pressure. As soon as the vapors of acetal reached a point about one-third the distance up the column of the still, a 0.2 weight percent solution of phosphoric acid in 1,1-diallyloxy-4-pentene was added slowly to the boiling liquid in the kettle. The dealcoholation reaction commenced with the introduction of catalyst into the kettle, and the rate of dealcoholation increased as the catalyst concentration in the kettle increased. The products of dealcoholation, allyl alcohol and 1,4-pentadienyl allyl ether, were removed from the distillate as rapidly as they were formed. The addition of catalyst solution was continued until the concentration of phosphoric acid in the kettle liquid amounted to 0.1 weight percent based on the acetal. At this point, 1,1-diallyloxy-4-pentene containing no catalyst was substituted as the feed and this feed was continued to maintain a constant volume of liquid (approximately 500 ml.) in the kettle. The kettle temperature was maintained at 139° C. to 146° C. during the continuous operation, and the pressure was maintained at about 150 mm. of Hg at the head of the still.

The rate of removal of distillate was regulated to maintain a temperature of approximately 100° C. at a point in the column about one-third the distance from the top. Operating in this manner, the vapor temperature was 79° C. to 83° C.

The distillated collected in the receiver was inhibited with about 0.3 weight percent of di(2-ethylhexyl)amine, based on the total distillate, to prevent polymerization of the 1,4-pentadienyl allyl ether or recombination of said ether with the allyl alcohol.

To terminate the continuous operation, the feeding of acetal was discontinued and the dealcoholation was continued to exhaust the acetal from the kettle, but the distillate was removed at a faster rate than the acetal was being dealcoholated, so that some unconverted acetal was collected in the distillate.

The total acetal charged during the run was approximately 1045 grams of 1,1-diallyloxy-4-pentene. About 1001 grams of distillate was collected and the residue amounted to approximately 44 grams. The overall yield of 1,4-pentadienyl allyl ether was 85.6 percent at an efficiency of 95 percent. The residue amounted to about 4.2 percent of the total input to the still. The residue appeared to be formed more rapidly after the end of the continuous operation as the volume of the liquid in the kettle decreased and the catalyst concentration increased.

Refined 1,4-pentadienyl allyl ether was obtained by distillation of the distillate obtained from the dealcoholation reaction. The refined 1,4-pentadienyl allyl ether had the following properties:

Boiling point _____ 53° to 55° C./25 mm. of Hg.
Specific gravity _____ 0.838 at 20/15.6° C.
Refractive index _____ $n_D^{20}$, 1.4503.
Purity by hydrolysis and determination of carbonyl equivalent _____ 98.9 percent.
Purity by bromination _____ 98.7 percent.

*Example II*

Four hundred grams of 1,1-diethoxy-4-pentene (the acetal of 4-pentenal and ethanol) was charged into a 1-liter still kettle. The pressure in the still was reduced to 400 mm. of mercury and the acetal was heated to boiling. As soon as the vapor of acetal reached a point about one-third the distance up the column and the temperature at this point reached 133° C., a 0.2 percent solution of phosphoric acid in 1,1-diethoxy-4-pentene was added slowly to the boiling liquid in the kettle. The dealcoholation reaction commenced with the introduction of catalyst into the kettle, and the rate of dealcoholation increased as the catalyst concentration in the kettle increased. The products of dealcoholation, i.e., ethanol and 1,4-pentadienyl ethyl ether, were removed from the distillate as rapidly as they were formed. The addition of catalyst solution was continued until the concentration of phosphoric acid in the kettle liquid amounted to 0.1 weight percent based on the acetal. At this point, 1,1-diethoxy-4-pentene containing no catalyst was substituted as the feed and this feed was continued to maintain a constant volume of liquid (approximately 500 ml.) in the kettle. During the continuous operation an additional 0.05 weight percent of phosphoric acid catalyst was added to the kettle liquid, again as a dilute solution in 1,1-diethoxy-4-pentene. The kettle temperature was maintained at 136° to 138° C. during the continuous operation, and the pressure was maintained at about 400 mm. of mercury at the head of the still.

The rate of removal of distillate was regulated to maintain a temperature of about 100° C. at a point in the column about one-third the distance from the top. Operating in this manner, the vapor temperature was 78° to 84° C.

The distillate collected in the receiver was inhibited with di-(2-ethylhexyl)amine to prevent polymerization of the 1,4-pentadienyl ethyl ether or recombination of the ether with the ethanol.

To terminate the continuous operation, the feeding of acetal was discontinued and the dealcoholation was continued to exhaust the acetal from the kettle, but the distillate was removed at a faster rate than the acetal was being dealcoholated so that some unconverted acetal was collected in the distillate.

The total acetal charged during the run was approximately 1093 grams of 1,1-diethoxy-4-pentene. About 1058 grams of distillate was collected. The overall yield of 1,4-pentadienyl ethyl ether was 87.7 percent at an efficiency of 94.3 percent. The residue amounted to about 2.5 percent of the total input to the still.

Refined 1,4-pentadienyl ethyl ether was obtained by distillation of the distillate obtained from the dealcoholation reaction. The refined 1,4-pentadienyl ethyl ether had the following properties:

| | |
|---|---|
| Boiling point | 119° to 120° C./atmospheric pressure; 47° to 48° C./50 mm. of Hg. |
| Specific gravity | 0.8085 at 20/15.6° C. |
| Refractive index | $n_D^{20}$, 1.4310. |
| Purity by hydrolysis and determination of carbonyl equivalent | 101.5 percent. |
| Purity by bromination | 98.8 percent. |

Elemental analysis for 1,4-pentadienyl ethyl ether was as follows:

| | Carbon, percent | Hydrogen, percent |
|---|---|---|
| Observed | 74.1 | 10.9 |
| Calculated | 74.9 | 10.8 |

Although the invention has been illustrated with reference to acetals of 4-pentenal as the starting material, and to phosphoric acid as the catalyst, the invention is not to be regarded as limited to the materials used in the exemplary examples, but is applicable to acetals of other 4-pentenals and dealcoholation catalysts as hereinbefore disclosed.

Various modifications and embodiments of this invention can be made without departing from the spirit and scope thereof.

What is claimed is:

1. 1,4-pentadienyl alkenyl ether wherein the alkenyl moiety contains not more than 12 carbon atoms.

2. 1,4-pentadienyl allyl ether.

References Cited in the file of this patent
UNITED STATES PATENTS

| | | |
|---|---|---|
| 2,344,085 | Halbig et al. | Mar. 14, 1944 |
| 2,482,725 | Bramwyche et al. | Sept. 20, 1949 |
| 2,573,678 | Saunders | Nov. 6, 1951 |
| 2,667,517 | Longley | Jan. 26, 1954 |
| 2,722,532 | Arth et al. | Nov. 1, 1955 |

OTHER REFERENCES

Pudovik et al.: Chemical Abstracts, vol. 44 (1950), pgs. 1893–1895.